No. 865,311. PATENTED SEPT. 3, 1907.
I. LUDLOW.
STREET CLEANER.
APPLICATION FILED NOV. 18, 1902.
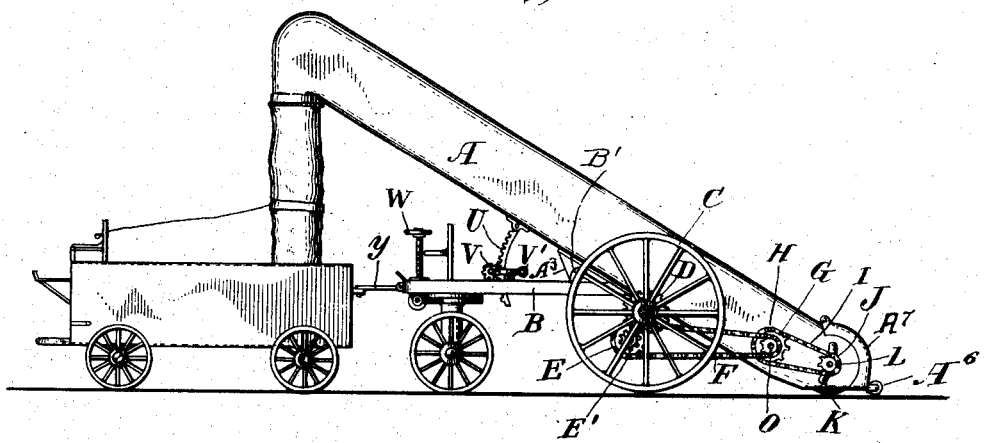
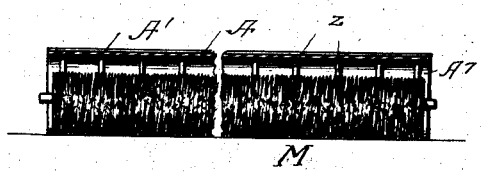
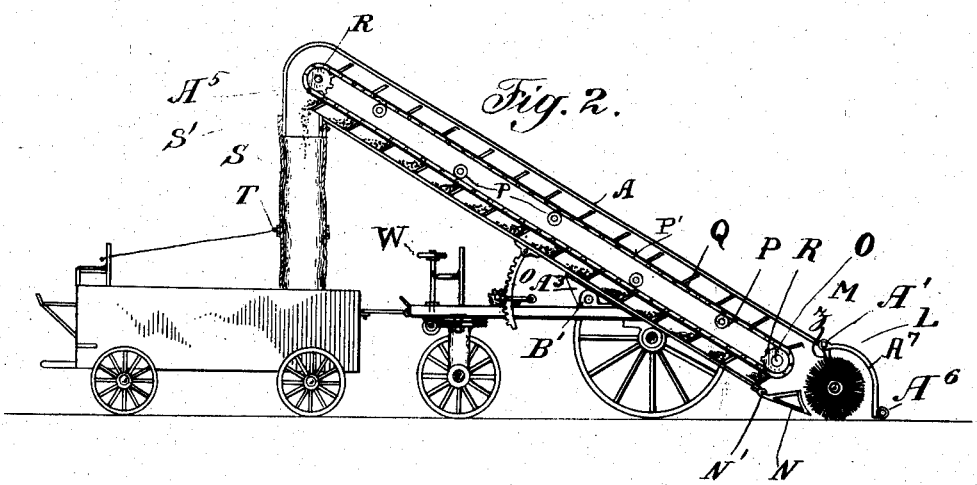
WITNESSES: INVENTOR
Israel Ludlow
BY
Geo. W. Mills
ATTORNEY

UNITED STATES PATENT OFFICE.

ISRAEL LUDLOW, OF NEW YORK, N. Y.

STREET-CLEANER.

No. 865,311.      Specification of Letters Patent.      Patented Sept. 3, 1907.

Application filed November 18, 1902. Serial No. 131,828.

*To all whom it may concern:*

Be it known that I, ISRAEL LUDLOW, a citizen of the United States, and a resident of New York, in the county and State of New York, have invented a certain new and useful Improvement in Street-Cleaners, of which the following is a specification.

My invention relates to an improvement in street sweepers and like devices and the object is to provide an improved apparatus of this kind that will remove the dirt or snow from the street and deposit it in a vehicle or into bags for transportation.

The invention is more clearly set forth in the following specification and claims and shown in the accompanying drawings, in which Figure 1 shows a side view of my sweeper; Fig. 2 shows a partial longitudinal section of Fig. 1; and Fig. 3, is a view partly in section and partly in elevation illustrating a detail of the invention.

In the drawings A, denotes the conveyer casing.
B is the supporting frame for carrying my sweeper and its various parts. This frame is mounted on wheels in any desired manner.

Mounted upon the frame B are two brackets B' in which support $A^3$ carried by the casing A is loosely mounted so as to move freely therein.

At the lower end of the casing is hinged at N' a separate short apron N.

Mounted near the opposite ends of the case are shafts provided with sprocket wheels R, R. Engaging the wheels R, R, are the endless chains P', which carry blades or shovels projecting therefrom on an incline.

Mounted upon the hub of one of the wheels of the vehicle and fixedly secured thereon is a gear wheel D, which meshes with a gear wheel E' fixedly mounted on a shaft carrying a sprocket wheel E. A sprocket chain F meshes with sprocket wheel E and with another sprocket wheel G which is fixedly mounted on the outer end of the shaft O, which shaft also has fixedly mounted on it the sprocket wheel R inside the chute. This shaft also carries a sprocket wheel H which carries a sprocket chain I which meshes with a sprocket wheel J fixedly mounted on the shaft carrying the brush. This chain of gearing as aforesaid is preferably so arranged that the speed of the brush is greater than that of the shaft O and the speed of the shaft O is greater than that of the wheel of the vehicle to which it is geared.

The upper part or roof of the chute near its lower end is jointed by a hinge joint at A' just above the brush and this jointed portion $A^7$ which surrounds the back and top of the brush carries a wheel $A^6$ to permit it to freely pass over the ground. This portion of the casing A also carries teeth z which teeth are adapted to rest on the bristles of the brush to clean it. The shaft L which carries the brush is mounted in guideways K so as to permit of vertical movement due to the unevenness of the ground being traveled over.

At the upper end of the chute there is an elbow formed and on this elbow is secured a flexible spout or chute S of any suitable material and length. This spout or chute has a hoop or ring surrounding it adapted to have a rope or other suitable material attached to it so as to control its movement and distribute the refuse around the vehicle in which it is being deposited.

The casing is so mounted that it can be readily tilted to the position shown or can be made parallel with the frame B which carries it as desired by means of the pinion V which is operated by the handle V' and meshes with the toothed rack U.

I provide rollers P loosely mounted in the side of the casing A on which the endless belt carrying the blades Q Q rest so as to hold the blades Q Q in contact with the platform $A^4$.

I control the operation of the frame carrying my sweeper, by means of the steering mechanism W.

The operation of my improved sweeper is as follows. The vehicle is attached to a car or wagon and is drawn through the street it is desired to clean. This revolves the wheel upon which is fixedly mounted the gear wheel D which in turn revolves gear E' and sprocket wheel E, sprocket wheel G through chain F. Sprocket wheel G being fixedly mounted on shaft O carrying sprocket R revolves wheel R and sets the blades Q Q into operation. Shaft O also revolves sprocket H mounted thereon and this in turn through chain I revolves sprocket J and brush M. When the apparatus is in operation the brush M which is made of any suitable material revolves rapidly and throws dirt, snow &c. up onto the casing where the shovels or blades Q sweep it or push it up the casing till it reaches the elbow $A^5$ where it drops into the flexible spout or chute, and is emptied into and distributed around any desirable vehicle.

What I claim as new and desire to secure by Letters Patent is:—

In combination with a suitably supported casing, a conveyer arranged therein, a brush mounted within the casing, a hinged section on the casing extending above the brush, a wheel carried by the hinged section, and teeth depending from the hinged section engaging the brush for cleansing the same, and mechanism for operating the brush and conveyer.

In testimony whereof, I have signed my name to this specification, in the presence of two subscribing witnesses.

ISRAEL LUDLOW.

Witnesses:
    WILLIAM S. GREY,
    JOHN O. GEMPLER.